United States Patent [19]

Teraslinna et al.

[11] Patent Number: 5,001,702
[45] Date of Patent: Mar. 19, 1991

[54] PACKET SWITCHING NETWORK FOR MULTIPLE PACKET TYPES

[75] Inventors: Kari T. Teraslinna, Naperville; Wing N. Toy, Glen Ellyn, both of Ill.

[73] Assignee: AT&T Bell Laboratories, Murray Hill, N.J.

[21] Appl. No.: 412,725

[22] Filed: Sep. 26, 1989

[51] Int. Cl.$^5$ .............................................. H04J 3/26
[52] U.S. Cl. ........................................ 370/60; 370/94.1
[58] Field of Search .................. 370/60, 60.1, 62, 94.1, 370/94.2, 94.3, 99

[56] References Cited

U.S. PATENT DOCUMENTS

| | | | |
|---|---|---|---|
| 4,651,318 | 3/1987 | Luderer | 370/94 |
| 4,701,906 | 10/1987 | Ransom et al. | 370/60 |
| 4,734,907 | 3/1988 | Turner | 370/60 |

OTHER PUBLICATIONS

J. S. Turner, "Design of a Broadcast Packet Switching Network", *IEEE Transactions on Communications*, vol. 36, No. 6, Jun. 1988, pp. 734–743.

H. Suzuki, "Output-Buffer Switch Architecture for Asynchronous Transfer Mode", *IEEE International Conference on Communications*, vol. 1, Jun. 11–14, 1989, pp. 4.1.1–4.1.5.

H. Kuwahara, "A Shared Buffer Memory Switch for an ATM Exchange", *IEEE International Conference on Communications*, vol. 1, Jun. 11–14, 1989, pp. 4.4.1–4.4.5.

*Primary Examiner*—Douglas W. Olms
*Assistant Examiner*—Melvin Marcelo
*Attorney, Agent, or Firm*—R. T. Watland; K. H. Samples; F. W. Padden

[57] ABSTRACT

A packet switching arrangement for receiving packets including broadcast addresses and connecting representations of the received packets to any combination of output ports specified in the address is disclosed. The packet routing units of the network both generate packet representations and selectively connect the representations to downstream routing units or network outputs. Packets for use with the network comprise an address portion encoded in a broadcast format or in a shorter point-to-point format and an address type character identifying the type of address in the address portion. The nodes of the network respond to the address type character of a received packet by selecting the appropriate decoding format for the packet address portion. A packet select unit decodes the address portion in accordance with the selected decoding format and selectively connects the packet to the network outputs.

17 Claims, 6 Drawing Sheets

PACKET SELECT 220

PACKET SELECT

PACKET SELECT

PACKET SELECT

FIG. 14

PACKET SWITCHING NETWORK FOR MULTIPLE PACKET TYPES

CROSS-REFERENCE TO RELATED APPLICATION

This application is related to K. T. Teraslinna, U.S. patent application Ser. No. 412,952, filed Sept. 26, 1989.

TECHNICAL FIELD

The present invention relates to packet switching networks and particularly to improving the efficiency of packet routing networks conveying a plurality of packet types.

BACKGROUND OF THE INVENTION

The usefulness of packet switching networks for the transmission of digital information, particularly bursty type information generated by computer equipment, has long been recognized. Such networks are generally point-to-point in nature, in that a packet from a single source is routed to a single destination by a routing address attached to the packet. The network responds to the routing address by connecting the packet to the destination identified by the address.

Increasingly, packet switching networks are being used to convey other types of data which has different switching requirements. For example, the commercial delivery of television requires that individual packets be routed to multiple network output ports. In a video delivery arrangement, efficiency can be achieved by using a broadcast physical address for each packet which address defines multiple destinations for the video packet. Broadcast physical addresses tend to be relatively long compared to other address types.

Prior packet networks which deliver multiple data types, such as point-to-point and broadcast, use a single address format for the routing of all packets. The address format is selected to provide some overall efficiency, given a projected mix of data types, but inefficiencies remain since a single address type is not optimum for both data types.

One prior packet network for connecting both broadcast and point-to-point packets, which is disclosed in J. S. Turner, U.S. Pat. No. 4,734,907, issued Mar. 29, 1988, connects all packets to a routing network via a copy arrangement. Packet copies of broadcast packets are made in the copy arrangement until as many copies exist as there are destinations for the packet. A separate point-to-point destination address is then affixed to each packet copy and the packet copies with their new packet addresses are applied to the routing network which connects them to the appropriate network output ports. Point-to-point packets traverse the duplicating arrangement without duplication and are connected to the routing network with a point-to-point address. A main problem with this arrangement is that a separate complex copy network must be provided so that all packets appear as point-to-point packets when applied to the routing network and inefficiencies are created by introducing multiple point-to-point packets to the routing network when a single broadcast packet could suffice.

Another mixed data type network is disclosed in M. N. Ransom et al., U.S. Pat. No. 4,701,906, issued Oct. 20, 1987. The Ransom arrangement affixes a broadcast address to each packet entering the routing network without regard to whether the packet is of the point-to-point or broadcast type. Use of the relatively long broadcast addresses on point-to-point packets consumes more network bandwidth than would be needed to deliver the point-to-point packets, introducing network inefficiencies.

A need exists in the art for a packet switching arrangement for multiple types of packets in which it is possible to use the most efficient packet address type with each packet type.

SUMMARY OF THE INVENTION

This need is met and a technical advance is achieved in accordance with the present invention in which each packet includes an address portion encoded in one of a plurality of encoding formats and significantly a character identifying the type of address encoding format. The nodes routing network respond to the address portion and the character of the received packet to route the packet to the node output ports. The nodes respond to the address type character by selecting one of a plurality of decoding formats and by decoding the address portion of the received packet in accordance with the selected format. Advantageously, by permitting a choice of address types used with each packet, the most efficient address type is selected for each packet type improving the overall efficiency of the network.

In a disclosed embodiment, the switch nodes comprise a first decoder for decoding a first address type and a second decoder for decoding a second address type. A node responds to the address type character of a received packet by selecting the first or the second decoder to decode the packet address portion and by selecting a node output port in response to the selected decoder.

One operational example discloses the selective use of a broadcast address encoding format and a point-to-point address encoding format for different packet types. The switching nodes include both a broadcast and a point-to-point decoding arrangement. In response to the address type character of a received packet the node selects which of these two decoding arrangements is used to route the received packet to the node output ports. In one advantageous arrangement, the broadcast address comprises a bit map address and the point-to-point address comprises a binary encoded address.

The switch nodes of an embodiment of the invention, each include a plurality of packet selectors, each comprising a node output port. Each packet received by a node is applied substantially simultaneously to all of the packet selectors of the node and the packet selectors respond to the address and the address type character of the received packet by selectively connecting the packet to the output port of the packet selector. The individual packet selectors comprise a decoder for each of a plurality of address types and the address type character is used to select the particular decoder which controls the connection of a received packet to the packet selector output port. The use of a plurality of packet selectors allows simple and efficient generation of packet representations, when needed, and the connection of the representations to the output ports.

Advantageously, a packet switching network comprises a plurality of output nodes, each comprising network output ports. An additional node receives packets and responds to both the packet address portion, which is encoded in a one of a plurality of encoding formats, and the address type character for connecting the received packet to an output node. The output node responds to the address portion and the address type character to connect the packet to network output ports.

DETAILED DESCRIPTION

Figure 1:
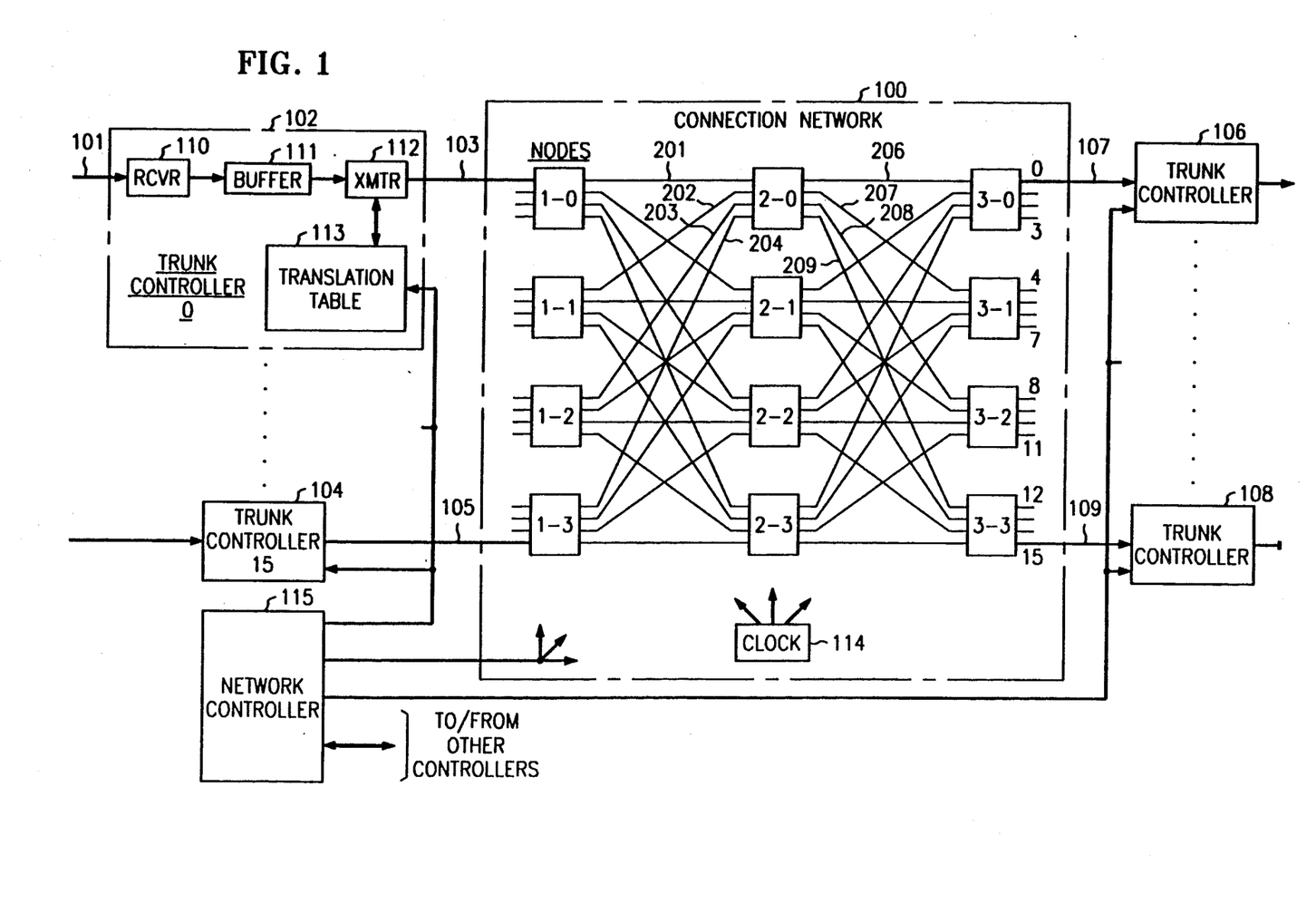
FIG. 1 is a block diagram of an exemplary packet switching arrangement.

FIG. 1 is a block diagram of a packet switching network comprising a connection network 100 having 16 input and 16 output ports. Each input port is connected to an incoming communication line, e.g., 101 via an individual input trunk controller, e.g. 102, 104 and each output port is connected to an individual output trunk controller of which trunk controllers 106 and 108 are specifically shown. Inputs to trunk controllers 102 through 104 and outputs of the trunk controllers 106 through 108 are conveyed at the rate of 45 Mbits per second.

Figure 2:
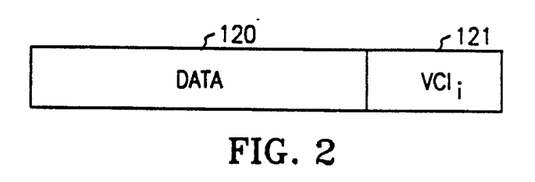
FIGS. 2 and 3 show packets received by and transmitted from, respectively, the trunk controllers of FIG. 1.
Figure 3:
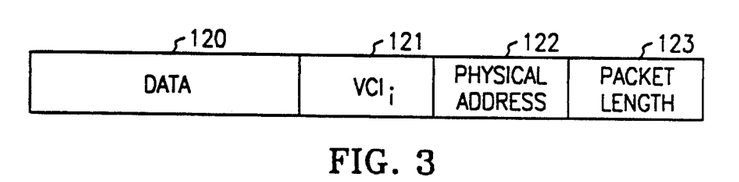

Input trunk controllers, e.g., 102 receive packets of the type shown in FIG. 2 which comprise a data portion 120 and a virtual channel identifier portion 121. Trunk controller 102 includes a receiver 110 which receives packets from line 101 and stores received packets in a first-in/first-out buffer 111. A transmitter 112 reads packets from buffer 111, reformats the packets to include a network physical address 122 (FIG. 3) and packet length variable 123 and sends the formatted packet to the network 100 in 8-bit blocks, via 8-bit positions of a 9-bit parallel path 103. The 9th-bit of the 9-bit parallel path 103 is used to convey a packet start bit at the beginning of each transmitted packet.

When a packet is read from buffer 111 by transmitter 112 the virtual channel identifier 121 (FIG. 2) is used to access a translation table 113 to obtain the network physical address 122 associated with the virtual channel identitiy. Transmitter 112 also computes the packet length in 8-bit bytes and appends the 16-bit physical address 122 (FIG. 3) and an 8-bit packet length variable 123 to the data portion 120. The physical address 122 is used by connection network 100 to select the one or more output ports which receive the packet.

The translation table 113 of each trunk controller is connected to a network controller 115 which maintains the translation tables. Network controller 115 receives requests for connections from other network controllers (not shown) associated with other switching networks, specifying the virtual channel identifiers of incoming packets and the destination outputs for packets including each virtual channel identifier. Network controller 115 responds to the requests by calculating the physical address needed to satisfy the request and storing the calculated physical address and virtual channel identifier in translation table, e.g., 113.

Connection network 100 is comprised of twelve 4-by-4 switching nodes arranged in three stages. Stage 1 comprises nodes 1-0 though 1-3, stage 2 comprises nodes 2-0 through 2-3 and stage 3 comprises nodes 3-0 through 3—3. Stage 1 is a distribution stage which does not duplicate packets but merely distributes the packets received at each input port over the nodes of the center stage 2 as is well-known in the art. Center stage 2 interprets the physical address 122 of the packets, replicates packets as needed and conveys them to the nodes of output stage 3. Each of the stage 3 nodes 3-0 through 3—3 replicates packets it receives, as needed, and connects them to output ports identified by the physical address.

Figure 4:
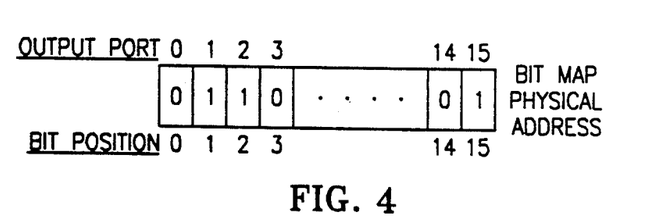
FIG. 4 shows a bit map physical address for use in the packet of FIG. 3.

The physical address 122 of packets in the present example is a bit map of the output ports. The bit map physical address, which is shown in FIG. 4, comprises 16-bit positions with a different position corresponding to each of the 16 output ports shown in FIG. 1 as 0 through 15. A "1" in a given bit position indicates that the packet is to be sent to the corresponding output port. The bit positions of the bit map are arranged so that bit positions 0 through 3 correspond respectively to output 0 through 3 of node 3-0, bit positions 4 though 7 correspond to outputs 4 through 7 of node 3-1. Bit positions 8 through 11 correspond respectively to outputs 8 through 11 of node 3-2 and bit positions 12 through 15 correspond respectively to outputs 12 through 15 of node 3—3. The center stage nodes, e.g., 2-0 interpret the bit positions in groups of four to determine the appropriate output node, e.g., 3-0 for each packet and each output stage node, e.g., 3-0 interprets the individual bits of the group corresponding to its output ports to select destination output ports.

Figure 5:
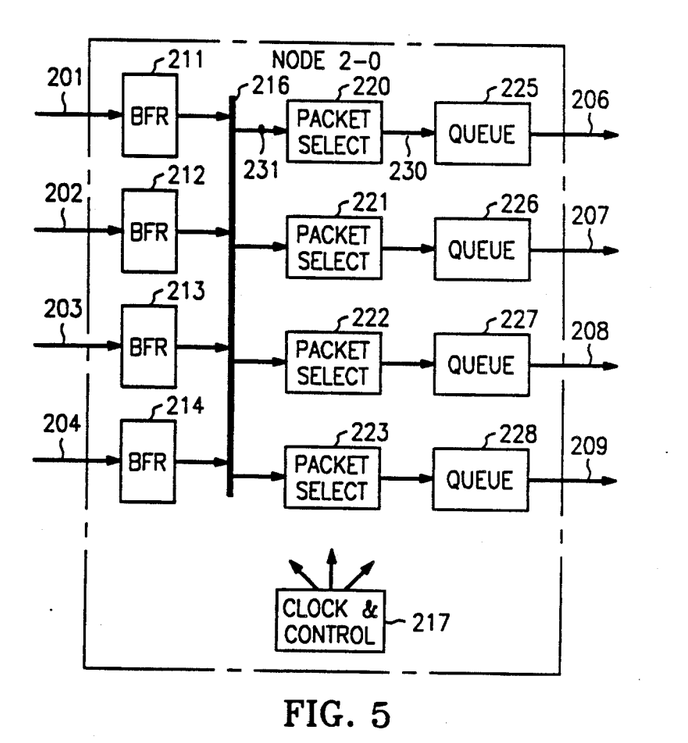
FIG. 5 is a block diagram showing the nodes of FIG. 1 in greater detail.

The node 2-0 shown in FIG. 5 represents all of the stage 2 and stage 3 nodes of the network. The FIG. 5 node, comprises four inputs 201 through 204 for nine parallel digits and four outputs 206 through 209 also for nine parallel digits. Each input, e.g., 201 is connected to a packet buffer 211 for receiving and buffering incoming packets. The node also includes a 9-bit bus 216 which is connected in parallel with all of the input buffers 211 through 214. A clock and control circuit 217 periodically polls each of the input buffers individually. A buffer which has accumulated an entire packet transmits the information in that packet in 8-bit bytes to the bus 216 upon being polled. Packets are transmitted on bus 216 at the rate of 250 Mbits per second which is somewhat faster than five times the individual incoming rate of 45 Mbits per second. The rate on bus 216 should be chosen to exceed four times the input bit rate so that all buffers can transmit a packet on bus 216 in less than or equal to the time required for receiving a packet. After one buffer has finished transmitting a packet it relinquishes the bus and another buffer is polled in a predetermined sequence.

Information transmitted on bus 216 is applied in parallel to four packet select units 220 through 223 each of which is respectively associated with a node output 206 through 209. In FIG. 5 packet select 220 is connected to bus 216 by a 9-bit parallel path 231. Each packet select unit determines from the packet address whether its associated output port is to receive the packet on the bus and store the packet in an associated one of packet queues 225 through 228. Packet select unit 220 is connected to queue 225 by a bus 230. The node presents each incoming packet substantially simultaneously to the packet selectors and permits the packet to be selected and held for one or more node outputs depending on the packet address. Each queue 225 through 228 includes a packet transmit unit (not shown) which reads packets in 8-bit bytes from its queue and transmits the bytes so read to a downstream node or output trunk controller, e.g., 106 at the rate of 45 Mbits per second.

Figure 6:
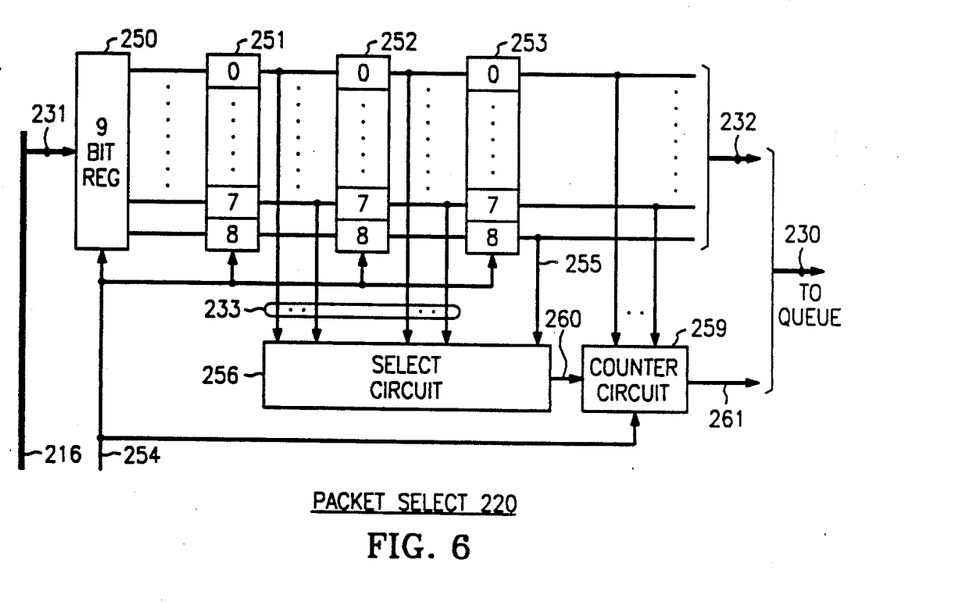
FIG. 6 is a block diagram of representative packet select unit.

FIG. 6 represents a packet select unit as used in stages 2 and 3 of the network of FIG. 1. Bus 216 is 9-bits wide, eight of which are used to convey data bits and the ninth is used to signal the start of a packet to the packet selectors 220 through 223 (FIG. 5). When a buffer, e.g., 211 begins to transmit a packet on bus 216 it places "1" start bit in the 9th-bit position of bus 216 during the first packet byte. All other bytes of the packet include a "0" 9th-bit. Clock and control circuit 217 applies receive clock signals, which are synchronized with the transmission of packet bytes, to a conductor 254 of each of the packet select circuits 220 through 223. Within each packet select circuit, e.g., 220 the receive clock signals are applied to four 9-bit registers 250 through 253. One receive clock signal occurs during each byte applied to bus 216. The first receive clock signal gates the first packet byte from bus 216 into 9-bit register 250 via path 231. The second receive clock signal gates the contents of register 250 to register 251 and loads the 2nd-byte from bus 216 into register 250. After the fourth receive clock signal the first packet byte, including the "1" start bit, is in register 253, the 2nd-byte is in register 252, the third is in register 251 and the fourth is in register 250. The start bit in register 253 is applied via conductor 255 to a select circuit 256.

When select circuit 256 receives a "1" start bit on conductor 255, registers 251 and 252 in combination contain the bit map address of the incoming packet and register 253 contains the 8-bit packet length variable. Select circuit 256 receives the bit map address on conductor 233 and responds to the "1" start bit on conductor 255 by decoding the bit map. A "1" is applied by select circuit 256 to a counter circuit 259 via conductor 260 when the bit map defines the node output associated with the select circuit. A "1" on conductor 260 indicates that the received packet is for the associated node output.

Counter circuit 259 responds to the "1" input from conductor 260 by storing the packet length variable 123 (FIG. 3) which is then contained by the 8-bit byte in register 253. Counter circuit 259 also receives the clock signals on conductor 254. At each pulse received on conductor 254 while counter circuit 259 contains a value greater than 0, counter circuit 259 transmits a write pulse on conductor 261, which is a part of bus 230, to the associated queue 225 then decrements by 1 the value stored in the counter. The write pulses on conductor 261 begin when a packet for queue 225 is detected and as many write pulses are sent to queue 225 as there are bytes in the packet as indicated by the packet length variable. The outputs of register 253 are applied to queue 225 via a 9-bit conductor 232 which is a part of bus 230. Queue 225 responds to the write pulses from counter circuit 259 by storing the bytes of the selected packet, which are successively gated through register 253 to queue 225. The bytes of packets applied to bus 216 are always gated through register 253, but when a packet is not selected by select circuit 256, no write pulses are generated on conductor 261 and the bytes are not stored in the queue.

The above discussion of nodes shown in FIG. 5 and packet selectors shown in FIG. 6 represents all of the nodes and selectors in the present embodiment. The address decoding function performed by the selector circuits, however, depends upon the particular packet selector and node including the selector circuit.

Figure 7:
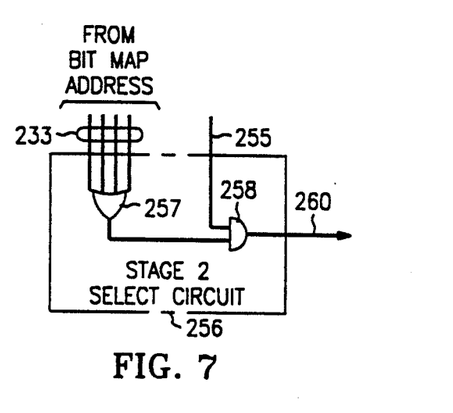
FIG. 7 shows a representative stage 2 select circuit.

The selector circuit in each stage 2 packet selector comprises a four input OR gate 257 and an AND gate 258 as shown in FIG. 7. OR gate 257 of packet select 220 receives as inputs over path 233 the 4-bit map address bits 0 through 3 from register 251 corresponding to the network output ports 0 through 3 reached via packet select 220. When any of these 4-bit map positions is a "1" OR gate 257 applies a "1" to AND gate 258. The "1" start bit on conductor 255 gates the output of OR gate 257 to conductor 260 resulting in the packet being stored in queue 225.

Packet select circuits 221 through 223 of stage 2 nodes are substantially identical to packet select circuit 220 except that their OR gate 257 is connected by path 233 to receive different parts of the bit map address. In packet select 221 OR gate 257 receives the second 4-bit map address bits, in packet select 222 OR gate 257 receives the third 4-bit map address bits from register 251 and in packet select 223 OR gate 257 receives the last 4-bits of the bit map address from register 251. All of the second stage nodes are identical to node 2-0.

Figure 8:
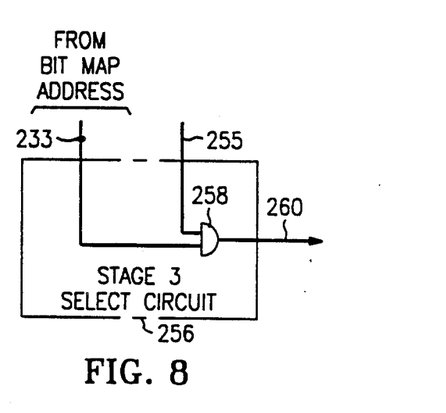
FIG. 8 shows a representative stage 3 select circuit.

The stage 3 nodes, 3-0 through 3-3, are substantially identical to the stage 2 nodes, 2-0 through 2-3, except that the address decoding within the select circuits 256 is different. Each stage 3 packet selector is uniquely associated with one output port. By the nature of the bit map address (FIG. 4) a packet is identified as destined for a particular output port by the value of the bit map digit corresponding to that output port. For example, the stage 3 packet selector associated with the first output port 0 need only interpret the first bit position 0 of the bit map address. When the first bit position is a "1" the packet is for the first output port and when it is a "0" the packet is not destined for the first output port. FIG. 8 represents a stage 3 select circuit 256 in which packet decoding is carried out by a single AND gate 258 which receives, as inputs, the packet start bit on conductor 255 from register 253 and the first bit of the bit map address from register 252 over path 233. The select circuit of FIG. 8 represents the select circuit connected to network output port 0 and it interprets only the first bit of the bit map address. The other packet selectors connected to the other network output ports 1 through 15 include an AND gate 258 which is connected by path 233 to the bit map address bit position corresponding to its associated network output port.

The physical address of packets in the preceding example comprises 1-bit for each possible network of output port. Such an address and its transmission on all of the packet network links requires a certain amount of communication bandwidth. The following description relates to alternative embodiments which reduce the bandwidth required for physical address transmission in broadcast packet networks.

Figure 9:
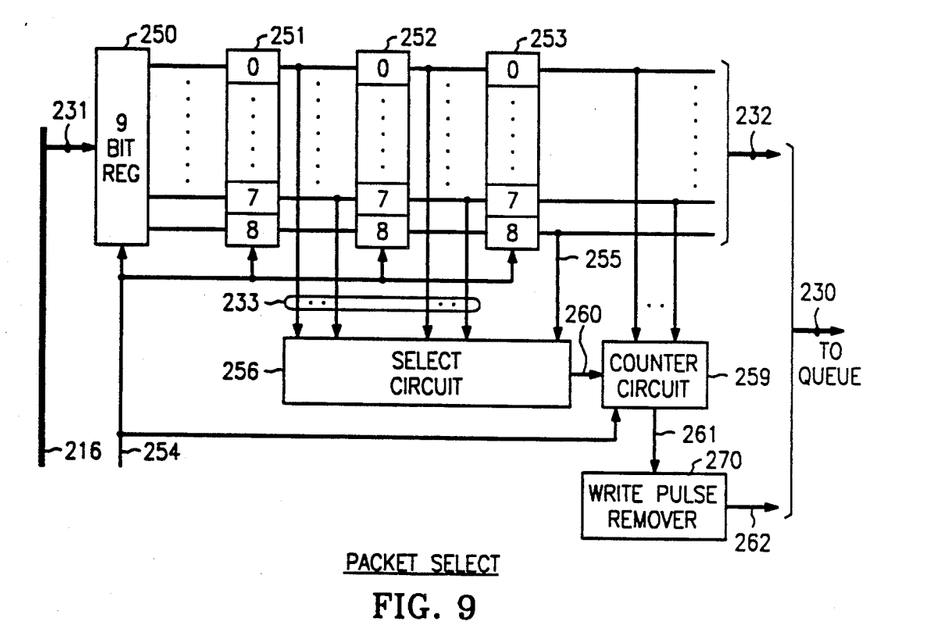
FIG. 9 is a block diagram of a packet select unit used to reduce the size of the packet address transmitted between network stages.

Address Bit Deletion FIG. 9

In the following embodiment, the bandwidth required to transmit broadcast physical addresses is reduced by deleting portions of the bit map address transmitted from stage 2 to stage 3. FIG. 9 represents a stage 2 packet select unit which is used to reduce the size of the physical address transmitted from stage 2 to stage 3. Select circuit 256 selects packets for storage in the associated queue as in the preceding embodiment. Bit map portions are deleted by inhibiting selected write pulses generated by counter circuit 259 after a packet is selected. FIG. 9 includes a write pulse removal circuit 270 which receives write pulses from counter circuit 259 on conductor 261 and deletes one selected write pulse from the write pulse string sent to queue 225 on conductor 262. The deletion of a write pulse causes the over writing of a byte in register 253 without storage of that byte in the queue and thus, the deletion of one byte from the packet.

Stage 3 nodes 3-0 and 3-1 respond only to the first and second 4-bit groups of the bit map address, respectively and do not use the 3rd and 4th 4-bit groups. Similarly, stage 3 nodes 3-3 respond only to the 3rd and 4th-bit groups of the bit map address, respectively and do not use the first and second 4-bit groups. In packet select units 220 and 221 the second 8-bits of the bit map address need not be sent to output nodes 3-0 and 3-1. In packet select unit 220 and 221 write pulse removal circuit 270 counts the first two write pulses from counter circuit 259 and inhibits the next write pulse (third) which occurs when the second 8-bit portion of the bit map address is in register 253. The absence of a write pulse causes the contents of register 253 to be overwritten without storage in the queue and thus deletes the byte from the packet.

In packet select units 222 and 223, the write pulse removal circuit 270 counts the first write pulse from circuit 259 and inhibits the second write pulse. The absence of a second write pulse deletes the first 8-bits of the bit map address from the packet before it is stored in the associated queue, e.g., 227.

Figure 10:
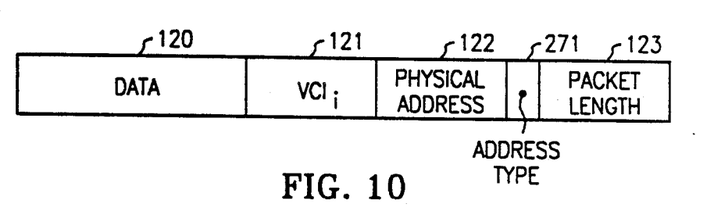
FIG. 10 shows a multiple address type packet format.
Figure 11:
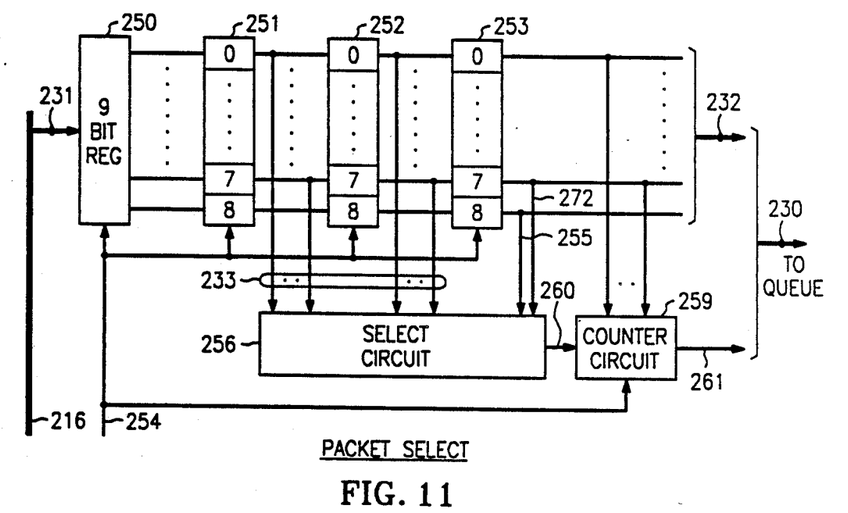
FIG. 11 shows a packet select unit for use with the packet shown in FIG. 10.
Figure 12:
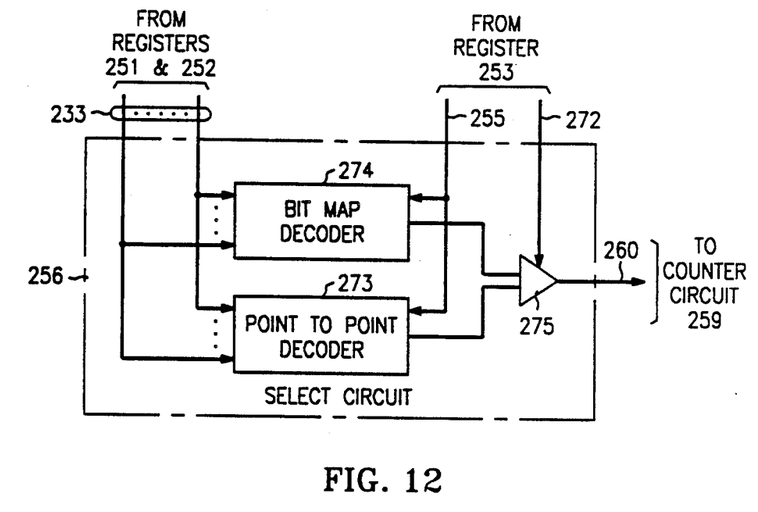
FIG. 12 shows a select circuit employed in the packet select unit of FIG. 11.

Multiple Address Types FIGS. 10, 11 and 12

A bit map address for a packet with a single destination comprises 16-bits in a network with 16 network output ports. A binary encoded point-to-point address designating a single network output port comprises only 4-bits as is well-known in the art. It has been found advantageous to provide binary encoded addresses with point-to-point packets and bit map addresses with broadcast packets. FIG. 10 shows a packet format for a network having a physical address field 122 which contains either a bit map address or a binary address and an address type character 271 which identifies the type of physical address included in the packet. In FIG. 10, the packet length variable 123 is 7-bits long and is followed by a one bit address type character 271 which identifies whether the physical address 122 is a bit map address or a binary encoded point-to-point address.

As previously described, the physical addresses are provided by translation table 113 (FIG. 1) in response to the virtual channel identifier of incoming packets. Each physical address is stored in translation table 113 by network controller 115 in response to a request for connection specifying the virtual channel to be used. Network controller 115 in the present arrangement responds to each request for connection by determining the type of packets, e.g., broadcast or point-to-point to be sent in the virtual channel which is the subject of the request. Network controller 115 then generates a physical address for packets which will satisfy the request. When the request is for a broadcast packet network controller 115 generates a bit map physical address of the type shown in FIG. 4. and stores that bit map address in translation table 113. Alternatively, when the request is for a point-to-point packet network controller 115 generates a binary address of the well-known type and stores that binary address in translation table 113.

The network operates as previously described with regards to FIGS. 1 through 6 except that packet select units, e.g., 220 selectively respond to the two different types of addresses. A packet select unit for use with packets of the dual address type (FIG. 10) is shown in FIG. 11. Packets are received and their beginning is identified as discussed with regard to FIG. 6. The bits of the packet physical address are applied to select circuit 256 via path 233 (FIG. 12). Packet select circuit of FIG. 12 is to be used with packets including either a point-to-point address or a bit map address. The select circuit comprises a first decoder 273 for binary addresses and a second decoder 274 for bit map addresses. When a new packet is indicated by the start bit on conductor 255 both decoders decode selected bit positions of the packet stored in registers 251 and 252. The address type bit (271, FIG. 10) is applied via conductor 272 to a selector 275 which gates the output of the bit map decoder to conductor 260 when conductor 272 conveys a "1", indicating a bit map address and gates the output of point-to-point decoder 273 to conductor 260 when conductor 272 conveys a "0" indicating a point-to-point address. Counter circuit 259 responds to a "1" selection signal on conductor 260 by generating write pulses on conductor 261 for storing the received packet in the associated queue, e.g., 225 as previously discussed.

The above embodiment shows an arrangement for selectively decoding point-to-point or bit map addresses. The arrangement can be extended to more than two address encoding formats by increasing the number of decoders in select circuit 256 and by providing a sufficient number of bits in the address type character 271 to identify the specific format used in the packet. Also the address encoding formats need not be bit map and point-to-point, but they can comprise any encoding formats. All that is required is that select circuit 256 be capable of performing the decoding functions defined by the address type character for each packet address.

Figure 13:
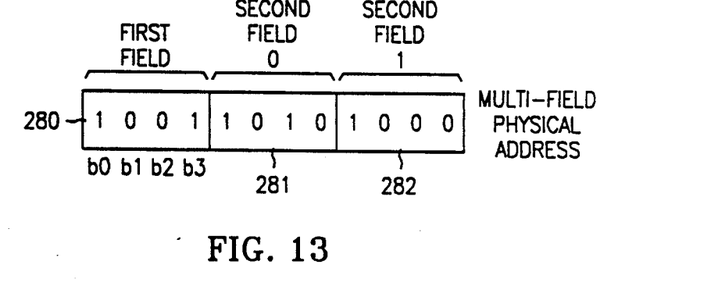
FIG. 13 shows the address portion for a two address field alternative packet format.
Figure 14:
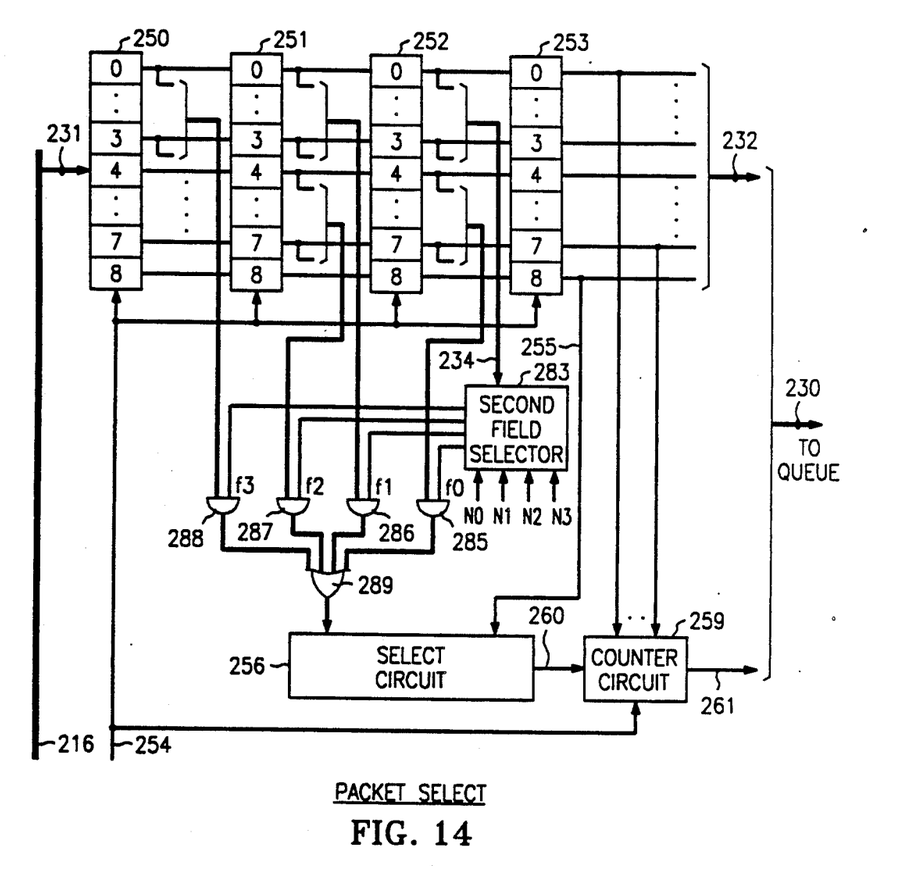
FIG. 14 is a block diagram of a packet select unit for use with the packet addresses of FIG. 13.

Two Field Addresses FIGS. 13 and 14

In an additional embodiment, the average packet address length can be shortened by using physical addresses comprising a first address field 280 (FIG. 13) identifying the output nodes, e.g., 3-0 which are to receive the packet and one or more second address fields, e.g., 281 and 282, one for each selected output node, defining the network output ports to receive the packet.

The first address field comprises a bit map of the output nodes and is interpreted by stage 2 nodes, e.g., 2-0. The 4-bit positions of the first address field are referred to as bits b0 through b3. The packet selectors 220 through 223 of a second stage node receiving the packet having a physical address shown in FIG. 13 interpret the "1001" first field and packet selectors 220 and 223 select the packet for the outputs 0 and 3 of the node corresponding to the "1s" in bit positions b0 and b3 of the first field. This is standard bit map decoding as described previously with regard to FIG. 8.

Outputs 0 and 3 of each second stage node are connected to stage 3 nodes, 3-0 and 3—3 respectively, both of which receive the packet. Nodes 3-0 and 3—3 apply the packet to the four packet selectors of those nodes, as described, regarding FIG. 5. Each of the packet selectors in nodes 3-0 and 3—3 selects one of the two second fields 281 and 282 to identify which output ports are to receive the packet. FIG. 14 shows a stage 3 packet select unit which selects the appropriate second field and decodes it to select packets for the node output ports.

The packet select of FIG. 14 includes a second field select unit 283 which selects the appropriate second address field and generates a select signal on one of the outputs f0 through f3. The select signal enables one of four AND gates 285 through 288 to pass a selected second address field to select circuit 256 via an OR gate 289. Select circuit 256 decodes the 4-bit address field as described regarding the stage 3 select circuit of FIG. 8. It should be mentioned that although AND gates 285 through 288 and OR gate 289 are each shown as a single gate in FIG. 14 they are actually four gates, one for each bit of the second address field operating in parallel.

Second field select unit 283 receives as inputs the 4-bits (bits b0 through b3) of the first address field from register 252 on path 234 and a "1" on only one of four inputs N0 through N3. The signals on inputs N0 through N3 identify the particular node including the packet selector. For example, packet selectors of node 3-0 receive a single "1" on conductor N0 while the packet selectors of node 3—3 receive a single "1" on conductor N3. The signals are applied to inputs N0 through N3 by permanently connecting "1s" and "0s" to these inputs when the node is fabricated, as is well known in the art.

Generally stated, the second field select unit 283 selects an address field by knowing the correspondence of its node and the bit positions of of the first address field, by counting the number of "1s" in the first address field up through its corresponding bit position in the first address field and by selecting the second address field of the same number. For example, second field select unit 283 of node 3—3 knows that it corresponds to digit b3 of the first address field (due to a "1" on input N3) and selects the second of the second address fields (second field 1) since the "1" corresponding to node 3—3 is the second "1" in the first address field 280.

The Boolean equations specifying in the operation of second field select unit 283 are as follows:

$$f0 = b0 \cdot N0 + b1 \cdot \overline{b0} \cdot N1 + b2 \cdot \overline{b1} \cdot \overline{b0} \cdot N2 + b3 \cdot \overline{b2} \cdot \overline{b1} \cdot \overline{b0} \cdot N3, \quad (1)$$

$$f1 = b0 \cdot b1 \cdot N1 + (b1 \cdot \overline{b0} + \overline{b1} \cdot b0) \cdot b2 \cdot N2 + \quad (2)$$

$$(b2 \cdot \overline{b1} \cdot \overline{b0} + \overline{b2} \cdot b1 \cdot \overline{b0} + \overline{b2} \cdot \overline{b1} \cdot b0) \cdot b3 \cdot N3,$$

$$f2 = b0 \cdot b1 \cdot b2 \cdot N2 + (\overline{b3} \cdot b2 \cdot b1 \cdot \overline{b0} + b3 \cdot \quad (3)$$

$$\overline{b2} \cdot b1 \cdot b0 + b3 \cdot b2 \cdot \overline{b1} \cdot b0 + b3 \cdot b2 \cdot b1 \cdot \overline{b0}) \cdot b3 \cdot N3, \text{ and}$$

$$f3 = b0 \cdot b1 \cdot b2 \cdot b3 \cdot N3. \quad (4)$$

After the appropriate second address field is selected, select circuit 256 decodes it in the manner described with regard to FIG. 8 to identify if the received packet is destined for the associated output port. When the packet is selected, a "1" is applied to counter circuit 259 which responds by transmitting write pulses on conductor 261 to the associated queue.

We claim:

1. In a packet switching system for switching information packets, a node comprising:
   a plurality of output ports;
   address decoder means for receiving a packet comprising an address portion including an address encoded in one of a plurality of formats and a character identifying the type of encoding format of said address portion and comprising means responsive to said address portion and said character of a received packet for selecting one of said output ports; and
   means responsive to said address decoder means for connecting said received packet to said selected output port.

2. The node of claim 1 wherein said address decoder means comprises:
   means responsive to said character for selecting a decoding format; and
   means for decoding said address portion in accordance with said selected decoding format to select said one of said output ports.

3. The node of claim 1 wherein said address decoder means comprises:
   first decode means for decoding the address portion of said received packet in accordance with a first decode format;
   second decode means for decoding the address portion of said received packet in accordance with a second decode format;
   means responsive to said character for selecting one of said first and said second decode means; and
   means responsive to said selected decode means for selecting one of said output ports.

4. The node of claim 1 wherein said address decoder means comprises:
   broadcast address decode means for decoding the address portion of said received packet in accordance with a broadcast address decode format;
   point-to-point decode means for decoding the address portion of said received packet in accordance with a point-to-point decode format;
   means responsive to said character for selecting one of said broadcast and said point-to-point decode means; and
   means responsive to said selected decode means for selecting one of said output ports.

5. The node of claim 1 wherein said address decoder means comprises:
   bit map decode means for decoding the address portion of said received packet in accordance with a bit map decode format;
   binary decode means for decoding the address portion of said received packet in accordance with a binary decode format;
   means responsive to said character for selecting one of said bit map and said binary decode means; and
   means responsive to said selected decode means for selecting one of said output ports.

6. In a packet switching system for switching information packets comprising an information portion, an address portion including an address encoded in one of a plurality of formats and an address type character identifying the encoding format of said address portion, a node comprising;
- a plurality of packet selector means each comprising an output port;
- means for conveying a packet received by said node substantially simultaneously to each of said packet selectors means; and
- each of said packet selector means comprises address decoder means responsive to said address portion and said address type character of said received packet for selectively connecting said received packet to the output port comprised thereby.

7. The node of claim 6 wherein said address decoder means of each of said packet selectors comprises:
- means responsive to said address type character for selecting a decoding format; and
- means for decoding said address portion in accordance with said selected decoding format to selectively connect said received packet to the one of said output ports comprised thereby.

8. The node of claim 6 wherein said address decoder means of each of said packet selector means comprises:
- first decode means for decoding the address portion of said received packet in accordance with a first decode format;
- second decode means for decoding the address portion of said received packet in accordance with a second decode format;
- means responsive to said address type character for selecting one of said first and said second decode means; and
- means responsive to said selected decode means for selectively connecting said received packet to the one of said output ports comprised thereby.

9. The node of claim 6 wherein said address decoder means of each of said packet selector means comprises:
- broadcast address decode means for decoding the address portion of said received packet in accordance with a broadcast address decode format;
- point-to-point decode means for decoding the address portion of said received packet in accordance with a point-to-point decode format;
- means responsive to said address type character for selecting one of said broadcast and said point-to-point decode means; and
- means responsive to said selected decode means for selectively connecting said received packet to the one of said output ports comprised thereby.

10. The node of claim 6 wherein said address decoder means of each of said packet selector means comprises:
- bit map decode means for decoding the address portion of said received packet in accordance with a bit map decode format;
- binary decode means for decoding the address portion of said received packet in accordance with a binary decode format;
- means responsive to said address type character for selecting one of said bit map and said binary decode means; and
- means responsive to said selected decode means for selectively connecting said received packet to the one of said output ports comprised thereby.

11. A packet switching network for switching information packets comprising an information portion, an address encoded in one of a plurality of formats and an address type character identifying the encoding format of said address comprising:
- a plurality of output switch nodes each comprising a plurality of network output ports;
- at least one additional switch node connected to said output switch nodes;
- means in said additional switch node responsive to said address and said address type character of a received packet for selectively connecting said received packet to one of said output nodes; and
- means in said one output node responsive to said address and said address type character for selectively connecting said received packet to the output ports comprised thereby.

12. A packet network comprising:
- a plurality of output switch nodes each comprising a plurality of output ports;
- at least one additional switch node connected to said output switch nodes;
- means for transmitting to said additional switch node a packet comprising an information portion, a network physical address and an address type character identifying the encoding format of said network physical address;
- first connecting means in said additional switch node responsive to said physical address and said address type character of a received packet for selectively connecting said received packet to one of said output switch nodes;
- second connecting means in said one output switch node responsive to said physical address and said address type character for selectively connecting the information portion of said received packet to the output ports comprised thereby.

13. The packet network of claim 12 wherein said first and second connecting means each comprise means responsive to said address type character for selecting one of said plurality of decode formats and means for decoding said physical address in accordance with said selected decode format.

14. A packet switching node for switching packets comprising an address type character and a plurality of bits comprising;
- a plurality of output ports;
- means for connecting first predetermined ones of said bits of a received packet to a first decode means and for connecting second predetermined ones of said bits of said received packet to a second decode means wherein said second predetermined ones of said bits include said first predetermined ones of said bits;
- said first decode means comprises means for decoding said first predetermined bits in accordance with a first decode format to select a first one of said output ports;
- said second decode means comprises means for decoding said second predetermined bits in accordance with a second address decode format to select another one of said output ports;
- means responsive to said address type character of said received packet for selecting one of said first and said second decode means; and
- means responsive to said selected decode means for connecting said received packet to the output ports selected thereby.

15. The node of claim 14 wherein said first decode means comprises a binary address format decoder and said second decode means comprises a broadcast address format decoder.

16. A packet switching arrangement comprising:

a packet switching network comprising a plurality of output ports;

means for transmitting to said packet switching network, a first packet comprising a broadcast physical address identifying a plurality of said output ports and a second packet comprising a point-to-point physical address identifying a single one of said output ports; and said packet switching network comprises means for decoding said broadcast physical address of said first packet and in response to said broadcast address decoding for connecting said first packet to said plurality of said output ports and means for decoding said point-to-point physical address of said second packet and in response to said point-to-point address decoding for connecting said second packet to said single one of said output ports.

17. A packet switching arrangement comprising:

a packet switching network comprising a plurality of output ports;

means for transmitting to said packet switching network a first packet comprising a broadcast physical address identifying a plurality of said output ports and a first address type character identifying a broadcast packet and a second packet comprising a point-to-point physical address identifying a single one of said output ports and a second address type character identifying a point-to-point-packet; and said packet switching network comprises means responsive to said first address type character identifying a broadcast packet for decoding said broadcast physical address of said first packet and in response to said broadcast physical address decoding for connecting said first packet to said predetermined ones of said output ports and means responsive to said second address type character identifying a point-to-point address for decoding said point-to-point physical address of said second packet and in response to said point-to-point address decoding for connecting said second packet to said single one of said output ports.

* * * * *